Dec. 29, 1925.

R. W. GOSSETT 1,567,263

COMBINED PULLEY AND GEAR

Filed Oct. 17, 1924

Inventor
Robert W. Gossett

By Davis & Davis

Attorneys

Patented Dec. 29, 1925.

1,567,263

UNITED STATES PATENT OFFICE.

ROBERT W. GOSSETT, OF SPARTANBURG, SOUTH CAROLINA, ASSIGNOR TO MANUFACTURERS' EQUIPMENT COMPANY, OF SPARTANBURG, SOUTH CAROLINA, A CORPORATION OF SOUTH CAROLINA AND NORTH CAROLINA.

COMBINED PULLEY AND GEAR.

Application filed October 17, 1924. Serial No. 744,238.

*To all whom it may concern:*

Be it known that I, ROBERT W. GOSSETT, a citizen of the United States of America, and a resident of Spartanburg, county of Spartanburg and State of South Carolina, have invented new and useful Improvements in Combined Pulleys and Gears, of which the following is a full and clear specification.

The object of this invention is to provide a combined pulley and gear especially adapted for looms of the Crompton and Knowles and other types, wherein the driving pulley carries a gear, both of which are repeatedly subjected to great strain and shocks, requiring that the pulley shall not only be rigidly anchored to the driven shaft, but shall also be rigidly connected to the gear, as more fully hereinafter set forth.

In the drawing—

Figure 1:
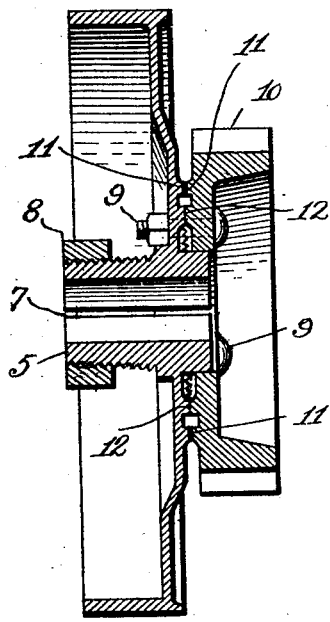
Fig. 1 is a vertical sectional view of my improved device.
Figure 2:
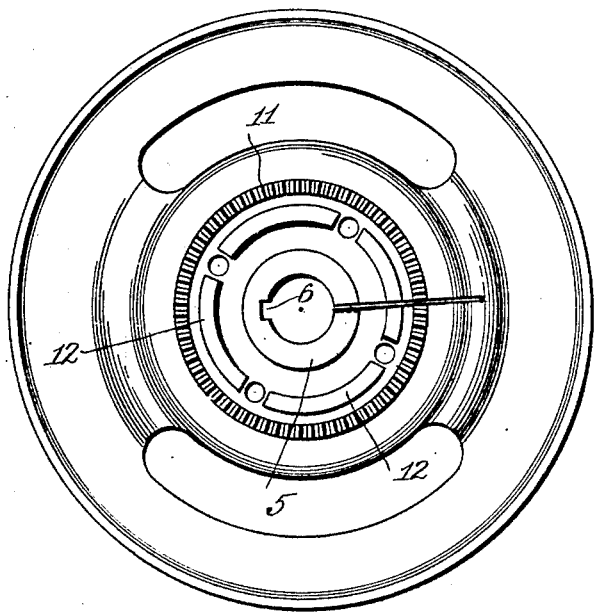
Figs. 2 and 3 are respectively side views of the pulley and the gear.
Figure 3:
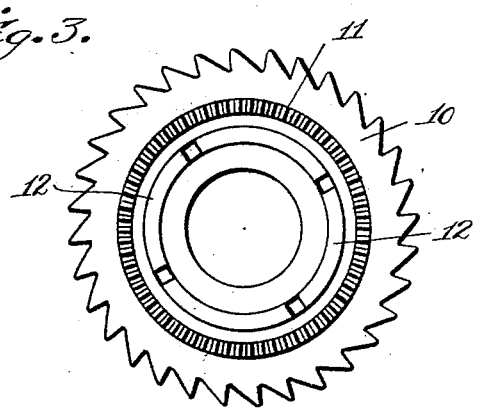

Referring to the drawing annexed by reference-characters, 5 designates the hub of the pulley, which is provided with the usual key-way 6 and is split longitudinally for its entire length by a radial slit 7, which extends from the eye of the hub radially outwardly to a point about half way the width of the body-web. The projecting portion of the hub is tapered outwardly externally and threaded, and on this threaded portion is screwed a nut 8. With this construction, the pulley may be fastened to the shaft without the use of set-screws, set-screws being objectionable for the reason that under repeated great shocks they work loose and thus permit the key-way to be quickly worn to uselessness.

Bolted to the web of the pulley by four bolts 9 is a gear 10, this gear being provided with a central eye for passage of the adjacent end of the hub of the pulley. The web of the gear and the web of the hub abut, being clamped solidly together by means of said bolts. The adjacent faces of the gear and the pulley are each provided with an annular series of serrations 11 which, when the pulley and the gear are clamped together by the bolts, interfit. These radial serrations take the strain off the bolts and thus prevent shearing or loosening of the bolts. In loom gears, this strain is very great, due to the fact that heavy jars are repeatedly applied to the gear by reason of the special construction of the operating mechanism of the loom. These interlocking serrations will take away all tendency of these shocks to loosen or shear the bolts. To insure a solid abutting relation between the gear and the pulley, I provide the abutting faces, at a point between the annular series of serrations and the hub, with an annular bearing 12 which serves to receive practically all the thrust of the clamping action and thus relieve the interlocking teeth of the most of this strain. These annular bearing-faces 12 are interrupted at the four points where the bolts are located.

In fastening this appliance to the shaft, it is desirable to first clamp the pulley-hub to the shaft by screwing in the nut 8. While thus clamping the pulley-hub to the shaft, the bolts 9 will be left slightly loose, so as to avoid straining the parts when the pulley-hub is contracted in bringing into clamping relation the shaft. Then, after the hub is thus clamped solidly to the shaft, the bolts 9 are tightened up to thus bring the serrations 11 and the annular thrust-rings 12 into rigid abutting relation, to thereby not only lock the gear against rotation with respect to the pulley, but also to assist the nut 8 in holding the split hub hard on the shaft. It will be observed that I extend the split 7 out into the web of the pulley; I do this in order to give ample expansibility to the hub without straining it in clamping it hard to the shaft. Notwithstanding the fact that the hub is cast integral with the web of the pulley, I find I can get ample resiliency by thus extending the slit 7 outwardly into the web. It will be observed that there are bolts 9 at opposite sides of the slit 7, and that when these bolts are tightened up hard they will assist the nut 8 in preventing the hub from spreading and loosening on the shaft.

It will be understood, of course, that I may apply my invention to any type of wheel other than a band pulley without departing from the scope of this patent.

What I claim is:

1. A combined wheel and gear embodying a pulley having an integral body and hub and provided on one face of its body with an annular series of serrations, a hubless gear provided on one of its faces with a similar series of serrations, bolts for clamping the gear and the pulley together with their serrations interlocking, said hub being longitudinally slit its entire length, said slit extending outwardly into the body to a point beyond said serrations, and means resiliently clamping the hub on a shaft.

2. A combined wheel and gear embodying a pulley having an integral body and hub provided on one face of its body with an annular series of serrations, a hubless gear provided on one of its faces with a similar series of serrations, bolts for clamping the gear and the pulley together with their serrations interlocking, the gear being provided with a central eye into which the hub of the pulley extends, said hub being longitudinally slit its entire length, said slit extending outwardly into the body to a point beyond said serrations, and means resiliently clamping the hub on a shaft.

3. A combined wheel and gear embodying a pulley having a hub and provided on one face with an annular series of serrations, a hubless gear provided on one of its faces with a similar series of serrations, and bolts for clamping the gear and the pulley together with their serrations interlocking, the pulley and the gear being both provided with annular abutting faces at a point between the annular series of serrations and the hub of the pulley.

4. A wheel having an integral body and hub split longitudinally its entire length and tapered exteriorly, said split extending out into said body, and a clamp-nut screwed on said tapered portion of the hub.

5. A combined belt wheel and gear consisting of a belt pulley having a hub and a web-body, the hub being provided with a key-way and also being provided with a longitudinal slit which extends out into the web, a hubless gear and bolts for screwing it to one face of the web of the pulley, the abutting faces of the gear and the pulley being provided with interlocking lugs and said bolts being arranged in the webs of the pulley and the gear at points at opposite sides of the aforesaid slit.

In testimony whereof I hereunto affix my signature.

ROBERT W. GOSSETT.